United States Patent Office 3,393,319
Patented July 16, 1968

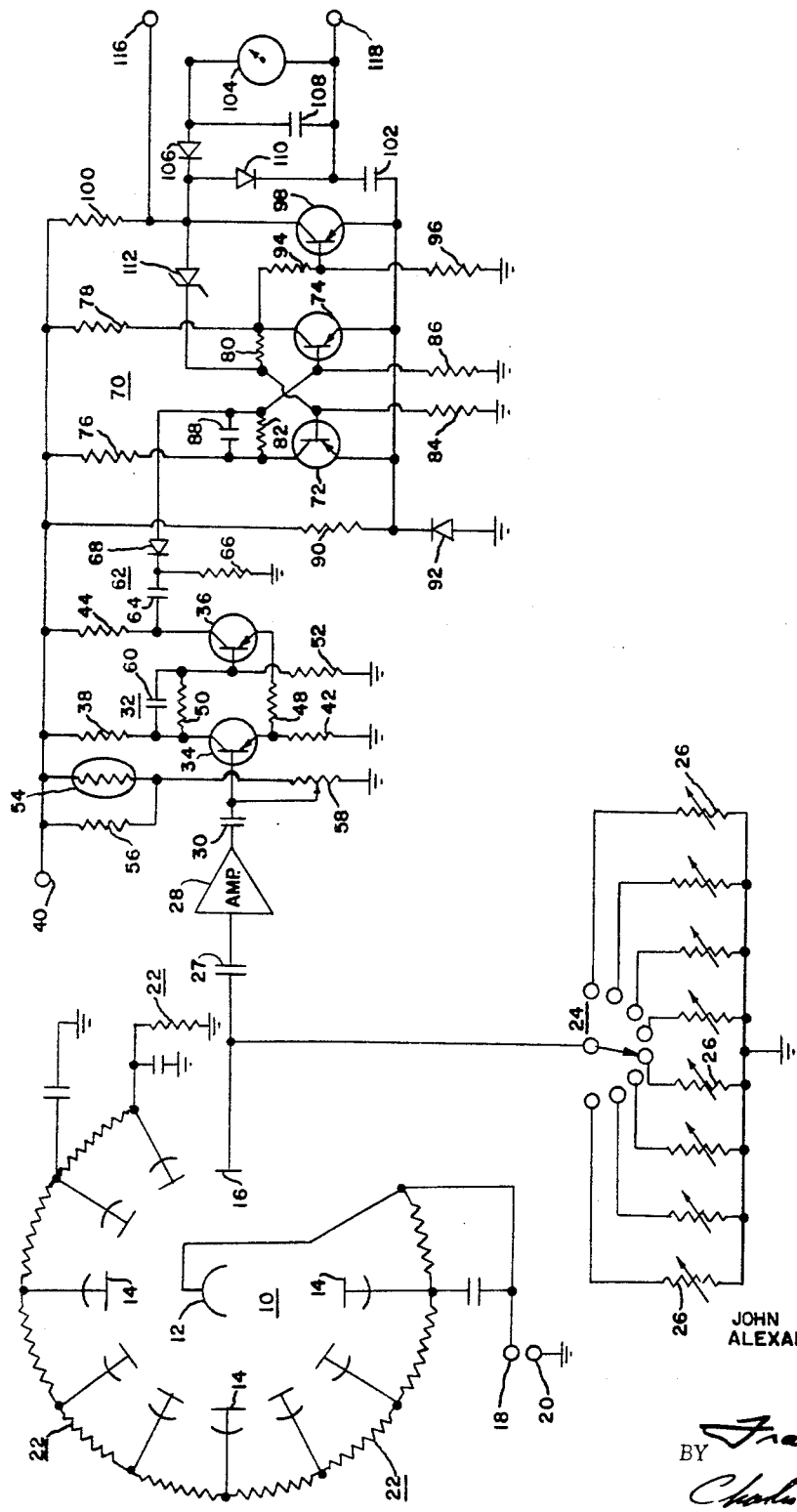

3,393,319
PHOTOELECTRIC CIRCUIT FOR COUNTING
LIGHT PULSES ABOVE A MINIMUM
VALUE
John M. Randall, Fairport, and Alexander E. Martens,
Greece, N.Y., assignors to Bausch & Lomb Incorporated, Rochester, N.Y., a corporation of New York
Filed Sept. 30, 1965, Ser. No. 491,720
9 Claims. (Cl. 250—207)

This invention relates to electrical measuring circuits in general and more particularly to photoelectric circuits for measuring the repetition frequency of radiation signals.

Hospitals, laboratories, etc. frequently require a room having a controlled atmosphere often referred to as a "clean room." Continuous or periodical checks must be made on the atmosphere in the "clean room" to assure that the concentration of airborne particles is below a desired level. The atmosphere contains a variety of sizes of dust particles in suspension. The number of dust particles per unit volume varies as an approximate inverse exponential function of the particle size, wherein the number of large dust particles is very low in comparison to the number of small dust particles. As a result, a measure of the cleanliness of the air can be defined as the concentration of particles having a diameter equal to and greater than a chosen standard size.

A typical standard of concentration is defined as air having $10^5$ particles per cubic foot with measurements greater or equal to 0.5 micron. In order to effectively measure the concentration of airborne dust particles per cubic volume of air, a count must be made of the number of particles per unit of air volume having size greater than various discrete selected sizes, so that a plot of particle size vs. concentration can be made and compared to the standard.

A detecting system such as an opto-electronic system can be conveniently employed to detect individual particles and to generate current pulses that are a direct function of the size of the particles observed. In order to effectively use such a detecting system as a portion of an electronic dust counter, the associated electronic equipment must be able to monitor the current pulses and provide measurement of the aerosol particle concentration covering a range of at least a decade above and below the standard of dust particle concentration. In addition, the electronic system must also be able to detect particle sizes equal to or greater than a variable preset minimum dust particle size so that a plot of dust particle size vs. concentration can be made over a range of at least a decade and a half of minimum particle sizes (0.3 micron to 10 microns).

If radiation sensitive devices, such as photomultiplier tubes etc., are used in conjunction with an optical detection system to monitor the number of dust particles and generate a signal that is related to the particle size, a number of non-linearities are introduced into the system due to the characteristics of the device employed. As a result, the range of signals generated by the radiation sensitive device may cover several decades of amplitudes corresponding to range of dust particle sizes monitored.

The signals generated by radiation sensitive devices are generally low level signals that must be amplified before the signals can be effectively applied to an amplitude discriminator circuit. With signals ranging over several decades of amplitude, it becomes extremely difficult to provide an amplifier circuit of sufficient gain to amplify the lower level signals (corresponding to small particle size) to a desirable level for amplitude discrimination, and at the same time provide for a dynamic range to cover the several decades of amplitudes and amplify the larger signals (corresponding to large particle sizes) without introducing additional problems due to noise interference. In addition, the sensitivity of the circuit must be made variable to selectively measure the particle concentration above a variably preset minimum size without changing the susceptibility of the system to noise interference or temperature problems.

It is therefore an object of this invention to provide a photoelectric circuit for measuring the repetition rate of radiation signals.

It is also an object of this invention to provide a photoelectric circuit for measuring the average repetition rate of random radiation signals having an amplitude above a preset minimum intensity level.

It is also an object of this invention to provide a photoelectric circuit for measuring the repetition rate of radiation signals of varying intensity over a variable range of preset minimum intensity levels.

It is also an object of this invention to provide a photoelectric circuit for measuring the repetition rate of radiation signals having a wide range of intensity levels and including means for changing the sensitivity of the circuit without increasing the susceptibility of the circuit to noise interference and temperature problems.

It is still a further object of this invention to provide a photoelectric measuring circuit that is adapted to be connected to an optical detection system to provide measurement of dust particles per given volume of air having a particle size greater than a variable range of preset minimum values.

The electrical measuring circuit embodying the invention includes a pulse or signal generating circuit, including a radiation sensitive device, that generates signal pulses in response to applied radiation signals of varying intensity having a repetition rate determined by the fluctuation rate of the radiation signals. The amplitude of the signal pulses being related to the amplitude of variation of the radiation signals. The circuit responds to a generated signal pulse above a preset minimum level to produce a current pulse of predetermined amplitude and fixed duration. These current pulses are coupled to a current responsive device, such as a meter, to provide a measurement of the average repetition rate of the current pulses generated.

In a specific embodiment wherein light radiation is to be monitored, a light sensitive device, a switching means and a plurality of resistive means are connected to provide a light sensitive signal generating circuit. The switching means functions to switch various combinations of the resistive means into the circuit. The signal generating circuit develops voltage pulses in response to applied light signals of abruptly varying intensity at a repetition rate determined by the fluctuation rate of the light signals and at an amplitude determined by the amplitudes of variation in intensity of the light signal and the resistance value of the resistive means selected by the switching means. The switching means effectively acts as a gain control for the signal generating circuit.

The signal generating circuit is coupled to a signal conveying circuit having a threshold bias level to pass only the voltage pulses having an amplitude greater than the threshold bias. A current pulse generating circuit, such as a multivibrator circuit, is coupled to the signal conveying circuit to develop a current pulse having a predetermined amplitude and a fixed duration in response to each voltage pulse passed by the signal conveying circuit. Current responsive means, such as a current meter, is coupled to the current pulse generating circuit to provide an indication of the repetition rate of the current pulses and thereby providing an indication of the fluctuation rate of the applied light signals having an amplitude of variations in intensity above a variable preset minimum value energy level.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawing illustrating a schematic circuit diagram of a photoelectric measuring circuit embodying the invention.

The electrical measuring circuit of the invention will be described in the context of a light sensitive opto-electronic dust counter. It should be understood that the fundamental concepts to be described are more generally applicable. For example, the light sensitive device may be sensitive to any portion of the light spectrum, i.e. ultraviolet, visible and infra-red. In addition, the circuit may be used to measure aerosol particles in general that may be suspended in any type of medium, gaseous, liquid, etc.

The electrical measuring circuit of the drawing includes a light sensitive device such as a photomultiplier tube 10 connected to detect abrupt fluctuations in, or impulses of, applied light energy. The photomultiplier tube 10 includes a light sensitive photo cathode 12, a plurality of dynodes 14 and an anode 16. The photomultiplier tube 10 is connected into a pulse or signal generating circuit that is adapted to be energized by a regulated high voltage power supply (not shown) to be connected across a high voltage supply terminal 18 and a reference terminal 20 (connected to ground).

The photo cathode 12 is directly connected to the high voltage supply terminal 18 while the plurality of dynodes 14 are connected to consecutive portions of a voltage divider 22 connected between the supply terminal 18 and ground. The energization potential applied to the photo cathode 12 and dynodes 14 remains substantially constant so that the current gain of the photomultiplier tube 10 remains substantially constant. The anode 16 is connected to a movable contact of a selector switch 24. The selector switch 24 includes a plurality of stationary contacts connected to ground through impedance means illustrated as a plurality of potentiometers 26.

The photomultiplier tube 10 generates a current that is directly related to the energy level or intensity of the light applied to the photo cathode 12. If fluctuating light signals or impulses of light energy are applied to the photo cathode 12, a corresponding fluctuating voltage signals or pulses are developed at the anode 16. The amplitude of the voltage signals or pulses is directly related to the resistance value of the connected potentiometer 26 and the amplitude of the applied light signal fluctuations or impulses. By setting the various potentiometers 26 to different values, the gain of the circuit is varied by switching the appropriate potentiometer in the circuit.

The voltage pulse developed at the anode 16 is coupled through a capacitor 27 to an amplifier circuit 28 having a fixed gain, amplified and coupled through a coupling capacitor 30 to a "Schmitt trigger" circuit 32. The "Schmitt trigger" circuit 32 includes a pair of transistors 34 and 36. The collector electrode of the transistor 34 is connected through a resistor 38 to a low voltage supply terminal 40 (adapted to be connected to a negative terminal low voltage power supply circuit, not shown), while the emitter electrode is connected to ground through a resistor 42. The collector electrode of transistor 36 is connected to the low voltage supply terminal 40 through a resistor 44 while its emitter electrode is connected to the emitter electrode of transistor 34 through a resistor 48. The signal and biasing voltage for the base electrode of the transistor 36 is provided by a voltage divider including two series resistors 50 and 52 connected between the collector electrode of the transistor 34 and ground. A biasing voltage for the base electrode of the transistor 34 is provided by a voltage divider connected between the low voltage supply terminal 40 and ground including a temperature sensitive device 54, such as a thermistor, connected in parallel with a resistor 56 and in series with a potentiometer 58. The movable arm of the potentiometer 58 is connected to the base electrode of the transistor 34 to provide a means for applying a variable biasing voltage thereto.

Under quiescent operating conditions (zero signal) the transistor 36 is conducting while the transistor 34 cuts off. The potentiometer 58 is set to provide a threshold bias level for the transistor 34 in the order of 0.8 volt so that a pulse of approximately 0.8 volt or greater is required to make the transistor 34 conduct. Upon the application of a signal or pulse greater than the threshold bias, the transistor 34 conducts and the transistor 36 cuts off to produce an output pulse having a fixed amplitude and a time duration determined by the duration of the input pulse. Capacitor 60 serves to improve the rise time of the output pulse. After the input signal is removed or reduced to a level below 0.8 volt the "Schmitt trigger" returns to its initial state and is in condition to receive another input pulse.

The output pulse generated by the "Schmitt trigger" circuit 32 is coupled to a differentiation circuit 62 including a capacitor 64 and a resistor 66 connected in series between the collector electrode of the transistor 36 and ground. The differentiation circuit 62 differentiates the leading and trailing edges of the pulse developed by the "Schmitt trigger" circuit. A gate circuit including the diode 68 is connected to the junction of the resistor 66 and the capacitor 64. The diode 68 is poled to only pass pulses having a negative going polarity.

The other end of the diode 68 is coupled to an input circuit of a bi-stable switching or multivibrator circuit 70 having two stable modes or conditions of operation in its switching cycle. The multivibrator circuit 70 includes a pair of transistors 72 and 74 having their emitter electrodes connected together and their collector electrodes connected to the low voltage source terminal 40 through the resistors 76 and 78 respectively. The base electrodes of the transistors 72 and 74 are connected to the collector electrode of the other through the resistors 80 and 82 respectively and to ground through the resistors 84 and 86 respectively. A capacitor 88 is connected across the resistor 82 to speed up the operation of the multivibrator circuit 70 in response to an input pulse from the diode 68. A substantially constant biasing voltage is applied to the emitter electrodes of the transistors 72 and 74 by a voltage divider connected between the low voltage source terminal 40 and ground including a series resistor and a forward biased diode 92.

In a first mode of operation, the transistor 72 is saturated while the transistor 74 is cut off. In a second mode of operation the transistor 72 is cut off while the transistor 74 is saturated. The constant bias voltage provided by the forward biased diode 92 insures the complete cut off of the transistor 72 and 74 in the second and first mode of operation respectively. A voltage pulse applied to the base electrode of the transistor 72 will switch the multivibrator circuit 70 into the first mode of operation while a voltage pulse applied to the base electrode of the transistor 74 will switch the multivibrator circuit 70 into the second mode of operation.

An output voltage pulse is developed at the collector electrode of the transistor 74 that approaches the value of the voltage at the supply terminal 40 in the first mode of operation (transistor 74 is cut off) and approaches zero volts in the second mode of operation (transistor 74 is saturated). The output voltage is coupled to the base electrode of a transistor 98 through a voltage divider biasing circuit including the series resistors 94 and 96 connected between the collector electrode of the transistor 74 and ground. The collector electrode of the transistor 98 is connected to the low voltage supply terminal 40 through a resistor 100 while the emitter electrode is connected to the emitter electrodes of the transistors 72 and 74 and the junction of the resistor 90 and the diode 92. The transistor is switched from saturation to cut off as the multivibrator circuit 70 is switched from the first mode of operation (transistor 74 is cut off) to the second mode (transistor 74 is saturated).

The transistor 98 provides a switching circuit for charging and discharging a capacitor 102. One end of the capacitor 102 is connected to the emitter electrode of the transistor 98 while the other end of the capacitor is connected to the collector electrode of the transistor 98 through a current sensitive device or meter 104 and a diode 106. The diode 106 is poled so that the capacitor 102 is charged through the resistor 100 and the meter 104 when the transistor 98 is cut off. A capacitor 108 is connected across the meter 104 to minimize the fluctuations of the meter 104 due to the pulses of current flowing therethrough. A diode 110 is connected between the collector electrode of the transistor 98 the end of the capacitor 102 connected to the meter 104 to discharge the capacitor 102 when the transistor 98 is saturated.

A Zener 112 diode is connected between the collector electrode of the transistor 98 and the base electrode of the transistor 72 to switch the multivibrator circuit in the first mode of operation. The Zener diode 112 is poled so that as the capacitor 102 charges through the resistor 100 (and the voltage at the collector electrode of the transistor 98 increases correspondingly) the Zener diode 112 breaks down to apply a switching pulse to the base electrode of the transistor 72.

It should be noted, that each time the multivibrator circuit 70 is in the first mode of operation (the transistor 98 is saturated) the capacitor 102 is effectively completely discharged. On the other hand, when the multivibrator 70 is the second mode of operation (the transistor 98 is cut off) the capacitor 102 is charged through the resistor 110 at a rate determined by the R-C (resistor-capacitor) time constant of the resistor 100 and the capacitor 102, to a maximum amplitude as determined by the Zener breakdown voltage of the Zener diode 112. Accordingly, since the capacitor 102 is effectively discharged each switching cycle of the multivibrator circuit, and charged at a preset rate to a predetermined amplitude, the current pulse flowing through the meter 104 is substantially equal for each complete cycle of the multivibrator 70. The current through the resistor 100 can be monitored at the terminal 116 while the voltage developed across the capacitor 102 can be effectively monitored at the terminal 118. These terminals can be connected to various recording and monitoring devices (not shown).

The electrical measuring circuit of the drawing is particularly adapted, but not necessarily limited, to be used in conjunction with an optical detection system as a dust counter. A standard type optical particle detection system can be employed to focus light energy on the photo cathode 12 that is in relation to the size of the particle monitored. The optical detection system may be of a type that applies an impulse of light to the photo cathode that is directly related to the size of the particle, or of the type that applies a constant light to the photo cathode and abruptly decreases the applied light in accordance to the size of the particle. In either case, fluctuations in the applied radiation intensity, or the application of an impulse of radiation energy, causes a corresponding change in current generated by the photomultiplier tube 10.

The potentiometers 26 are set at different resistance values so that the amplitude of the voltage pulse generated at the anode 16 is controlled by connecting various values of resistance into the circuit. This provides a gain or range control for the circuit. Accordingly, since the amplifier 28 has a fixed gain and the "Schmitt trigger" circuit 32 has a preset threshold level, the minimum change in intensity of radiant energy (and therefore the minimum dust particle size) that will actuate the "Schmitt trigger" circuit 32 is controlled by the value of resistance of the potentiometer 26 switched into the circuit. If for example the resistance value of the connected potentiometer 26 is increased, the gain of the circuit is increased and the amplitude of the current pulse generated by the photomultiplier 10 required to actuate the "Schmitt trigger" circuit 32 is correspondingly decreased thereby rendering the measuring circuit more sensitive to smaller dust particles.

Once the "Schmitt trigger" circuit 32 is actuated, the multivibrator circuit 70 is switched into the second mode of operation. The transistor 98 in turn is cut off thereby allowing the capacitor 102 to charge through the meter 104 at a predetermined rate until the voltage across the capacitor 102 reaches the amplitude required break down the Zener diode 112. When the Zener diode 112 breaks down, the multivibrator circuit 70 is switched into first mode of operation and the capacitor 102 is discharged through the diode 110 wherein the multivibrator circuit 70 is reset to receive another switching pulse from the "Schmitt trigger" circuit 32.

It should be noted that one current pulse (having a predetermined magnitude and a fixed time duration) flows through the meter 104 each time a voltage pulse is developed at the anode 16 having an amplitude (after amplification), sufficient to overcome the threshold bias on the "Schmitt trigger" circuit 32. The meter 104 will average the current pulses to produce a visual indication of the number of current pulses per a period of time or the average repetition rate. By merely setting the selector switch 24 to a potentiometer 26 having a predetermined resistance value, the repetition rate of the changes in the radiation intensity having a given minimum amplitude of change (corresponding to number of dust particles having a minimum size) will be indicating. To determine the repetition rate of lower level changes in radiation intensity (smaller dust particles), a higher value of resistance need only be switched into the circuit.

The measuring circuit of the drawing is employed in a dust counter circuit capable of measuring particle concentration from one thousand to one million particle per cubic foot. The potentiometers 26 are calibrated to provide a number of minimum particle size sensitivities ranging from 0.3 to 10 microns. The amplitude of current pulse generated by the photomultiplier tube in response to the range of particle sizes monitored varies over at least two decades of amplitude. By changing the gain of the signal generating circuit according to the minimum size of the particle to be detected and employing an amplitude discriminator circuit (Schmitt trigger circuit 32) having a constant threshold level, a means of changing the sensitivity of the circuit according to a minimum particle size is provided without changing the circuit susceptibility to false counts due to noise interferences.

With a fixed gain amplifier circuit 28, and an amplitude discriminator circuit (Schmitt trigger circuit 32) having a fixed threshold level, the potentiometers 26 are adjusted so that a current pulse generated by the photomultiplier tube 10 corresponding to the minimum size to be measured for the particular range exceeds the threshold level. As a result, the current pulse generated by the photomultiplier tube 10 corresponding to the minimum particle size and above need only be amplified to an amplitude sufficient to overcome the threshold bias. Accordingly, any non-linearity due to saturation of the amplifier due to high input signals does not create any problem, therefore the amplifier 28 can be a low cost amplifier having a limited dynamic range, without degrading the performance of the measuring circuit. In contrast, if the sensitvity of the measuring circuit was to be determined by a variable minimum amplitude discriminator, the pulses generated by the photo-multiplier tube 10 circuit must be substantially linearly amplified over the range of applied signal amplitude to keep the ratio between the signal amplitude constant for amplitude discrimination. This in turn requires an expensive amplifier having a dynamic range covering at least the range of signals corresponding to the range of minimum particle size selectivity (0.3 microns to 10 microns).

Furthermore, by using an amplitude discriminator, such as the "Schmitt trigger" circuit 32, with a preset threshold level, the discriminator circuit can be compensated for changes in temperature by a simple thermistor biasing circuit as illustrated. On the other hand, if such a circuit is to be employed as a variable threshold amplitude discriminator, a complicated temperature compensating circuit may be necessary to provide for a variable temperature compensation along with the variable threshold level.

We claim:
1. A photo-electric measuring circuit comprising:
   a radiation sensitive device for generating electrical currents in response to the application of radiation signals thereto;
   switching means;
   a plurality of impedance means;
   first circuit means interconnecting said radiation sensitive device, said switching means, and said plurality of impedance means in a signal generating circuit so that said switching means selectively connects one of said plurality of impedance means into said signal generating circuit, and wherein a voltage pulse is developed across the selected impedance means in response to changes in the intensity of radiation signals impinging on said radiation sensitive device having a repetition rate determined by the fluctuation rate of said radiation signals and having an amplitude determined by the amplitude of variation of said radiation signals and the impedance value of said selected impedance means;
   a signal conveying circuit coupled to said signal generating circuit and having a threshold bias to pass only voltage pulses having an amplitude great enough to overcome said threshold bias;
   second circuit means coupled to said signal conveying circuit for producing of a current pulse having a predetermined amplitude and fixed time duration in response to a voltage pulse generated by said signal generating circuit having an amplitude great enough to overcome said threshold bias, and
   third circuit means for coupling a measuring device to said second circuit means measuring the repetition rate of said current pulses.

2. A photo-electric measuring circuit comprising:
   a radiation sensitive device for generating electrical currents in response to the application of radiation signals thereto, the amplitude of said electrical current being directly related to the amplitude of said applied radiation signals;
   switching means;
   a plurality of impedance means;
   first circuit means interconnecting said radiation sensitive device, said switching means, and said plurality of impedance means in a signal generating circuit so that said switching means is adapted to variably connect selected ones of said plurality of impedance means into said signal generating circuit to control the gain thereof, and wherein a voltage pulse is developed across the selected impedance means in response to the application abruptly changes in the intensity of radiation signals on said radiation sensitive device, having a repetition rate determined by the fluctuation rate of said radiation signals and having an amplitude determined by the amplitude of variation of said radiation signals and the impedance value of said selected impedance means;
   a signal conveying circuit coupled to said signal generating circuit and having a threshold bias to pass only voltage pulses having an amplitude great enough to overcome said threshold bias;
   second circuit means coupled to said signal conveying circuit for producing of a current pulse having a predetermined amplitude and fixed time duration in response to a voltage pulse generated by said signal generating circuit having an amplitude great enough to overcome said threshold bias, and
   third circuit means for coupling a current responsive means to said second circuit means so that said current pulse flows through said current responsive means wherein said current responsive means measures the repetition rate of said voltage pulses exceeding said threshold level thereby providing an indication of the fluctuation rate of radiation signals having an amplitude of variation greater than a preset minimum level.

3. A photo-electrical circuit comprising:
   a photo-electric device adapted to be connected in an electrical circuit to generate a pulse of electrical current in response to an impulse of light energy;
   a selector switch having a plurality of stationary contacts and a movable contact for successive engagement with said plurality of stationary contacts;
   a plurality of resistors, each having at least a pair of terminals;
   first circuit means for connecting one of the terminals of said plurality of resistors to various ones of said plurality of stationary contacts;
   second circuit means connecting said photo-electric device, said selector switch movable contact and the other of said pair of terminals of said plurality of resistors to form a series circuit for producing pulses of voltage corresponding to impulses of light energy, the amplitude of said pulses of voltage being a function of the amplitude of the electrical current generated by said photo-electric device and the value of resistance of said plurality of resistors connected into the series circuit by said selector switch movable contact;
   an amplifier circuit connected to said second circuit means for amplifying said pulses of voltage;
   a pulse shaping circuit connected to said amplifier circuit, said pulse shaping circuit having a threshold level, which, when exceeded by an amplified pulse of voltage, generates an output pulse;
   a bi-stable multivibrator circuit having a first and a second mode of operation and including a first and a second input circuit for switching said multivibrator into said first and second modes of operation respectively, and an output circuit for developing an output signal that is a function at the mode of operation of said multivibrator circuit;
   third circuit means connecting said first input circuit to said pulse shaping circuit so that an output pulse generated by said pulse shaping circuit switches said multivibrator circuit in said first mode of operation;
   a charging circuit means including a capacitor, a resistor and a current sensitive meter connected in a series circuit;
   fourth circuit means connecting said charging circuit means to said multivibrator output circuit so that said capacitor charges through said meter to develop a voltage across said capacitor in response to a pulse applied to said first input circuit by said pulse shaping circuit;
   fifth circuit means connected between said charging circuit and said second input circuit to switch said multivibrator into said second mode of operation when said capacitor has charged to a predetermined level, and
   circuit means connected between said multivibrator output circuit and said charging circuit means for discharging said capacitor when said multivibrator is in said second mode of operation.

4. An electrical circuit comprising:
   a light sensitive device adapted to be connected in an electrical circuit to generate electrical current in response to the application of light energy;

a selector switch including a plurality of contacts, one of said plurality of contacts being adapted to make electrical connection with successive ones of the other ones of said plurality of contacts;

a plurality of resistive means, each having at least a pair of terminals;

first circuit means for connecting one terminal of said plurality of resistive means to various ones of said other ones of said plurality of contacts;

second circuit means interconnecting said light sensitive device, said one of said plurality of contacts and the other of said pair of terminals of said resistive means so that a voltage is developed across said ones of said plurality of resistive means connected to the circuit by said selector switch is a function of the current generated by said light sensitive device and the resistance value of said ones of said plurality of resistive means connected into the circuit;

a pulse generating circuit having a threshold voltage level, said pulse generating circuit being adapted to develop an output pulse when said threshold voltage level is exceeded;

third circuit means connecting said second circuit means to said pulse generating circuit for applying said voltage developed across said ones of said plurality of resistors connected into the circuit by said selector switch to said pulse generating circuit;

a multivibrator circuit having first and second modes of operation and first and second input circuits for switching said multivibrator into said first and second modes of operation respectively, said multivibrator circuit including a charging circuit including a series resistor and capacitor for charging said capacitor to a voltage when in said second mode of operation, circuit means connected between said charging circuit and said first input circuit for switching said multivibrator into said first mode of operation when the voltage across said capacitor reaches a predetermined level, and circuit means for discharging said capacitor when said multivibrator is in said first mode of operation;

fourth circuit means connecting said pulse generating circuit to said first input circuit so that an output pulse generated by said pulse generating circuit switches said multivibrator circuit in said second mode of operation; and circuit means, connected to said charging circuit, adapted to be connected to a measuring device for visual display of the current flow in said charging circuit when said voltage pulses developed across said ones of said plurality of resistive means connected into the circuit by said selector switch exceeds the threshold level of said pulse generating circuit.

5. An electrical circuit comprising:

a selector switch having a plurality of stationary contacts and a movable contact for making electrical contact with said plurality of stationary contacts;

a plurality of resistors;

circuit means connecting one end of said plurality of resistors to various ones of said stationary contacts so that said movable contact of selector switch can make an electrical connection with selected ones of said plurality of resistors;

a photomultiplier device;

circuit means connecting said photomultiplier device into an electrical circuit so that said photomultiplier device generates a pulse of electrical current in response to an impulse of light energy;

an amplifier circuit including an input circuit and an output circuit;

circuit means connecting said movable contact of said selector switch and the other end of said plurality of resistors between said photomultiplier device and said input circuit of said amplifier circuit so that an amplified voltage pulse is developed in said output circuit in response to a pulse of electrical current generated by said photomultiplier device, said amplified voltage pulse being the function of the electrical current developed by said photomultiplier device and the value of resistance of said resistors and selected by said selector switch;

a pulse generating circuit having an input voltage threshold level, said pulse generating circuit being adapted to develop an output pulse when said threshold level is exceeded;

circuit means connecting said amplifier circuit output circuit to said pulse generating circuit for applying said amplified voltage pulse to said pulse generating circuit;

a multivibrator circuit having first and second modes of operation and first and second input circuits for switching said multivibrator into said first and second modes of operation respectively, said multivibrator circuit including a charging circuit including a series resistor and capacitor for charging said capacitor through said series resistor to a voltage when in said second mode of operation, circuit means connected between said charging circuit and said first input circuit for switching said multivibrator into said first mode of operation when the voltage across said capacitor reaches a predetermined level, and circuit means for discharging said capacitor when said multivibrator is in said first mode of operation;

fourth circuit means connecting said pulse generating circuit to said first input circuit so that an output pulse generated by said pulse generating circuit switches said multivibrator circuit in said second mode of operation; and circuit means connected to said charging circuit adapted to be connected to a measuring device for visual display of the current flow in said charging circuit when said voltage pulses developed in said amplifier output circuit exceeds the threshold level of said pulse generating circuit.

6. An electrical circuit comprising:

a selector switch including a plurality of contacts, a first one of said plurality of contacts being adapted to make electrical connection with successive ones of the other ones of said plurality of contacts;

a plurality of resistive means, each having at least a pair of terminals;

circuit means for connecting one terminal of said plurality of resistive means to various ones of said other ones of said plurality of contacts so that said first one of said plurality of contacts makes an electrical connection with selected ones of said plurality of resistive means;

a light sensitive device adapted to be connected in an electrical circuit to generate an electrical current in response to the application of light energy signals;

circuit means connecting said light sensitive device into an electrical circuit so that said light sensitive device generates electrical currents in response to the application of light energy signal;

an amplifier circuit including an input circuit and an output circuit;

circuit means connecting said first one of said plurality of contacts and the other terminal of said pair of terminals between said light sensitive device and said input circuit of said amplifier circuit so that an amplifier signal is developed in said amplifier output circuit in response to an electrical current generated by said light sensitive device, said amplified voltage pulse being a function of the electrical current developed by said light sensitive device and the value of resistance of said resistance means selected for electrical connection by said selector switch;

a pulse generating circuit having an input voltage threshold level, said pulse generating circuit being adapted to develop an output pulse when said threshold level is exceeded;

circuit means connecting said amplifier circuit output circuit to said pulse generating circuit for applying said amplified signal to said pulse generating circuit;

a switching circuit having first and second modes of operation and first and second input circuits for switching said switching circuit into said first and second modes of operation respectively, said switching circuit including a charging circuit including a capacitive means for charging to a voltage when in said second mode of operation, circuit means connected between said charging circuit and said first input circuit for switching said switching circuit into said first mode of operation when said capacitive means is charged to a predetermined level, and circuit means for discharging said capacitive means when said switching circuit is in said first mode of operation;

circuit means connecting said pulse generating circuit to said first input circuit so that an output pulse generated by said pulse generating circuit switches said switching circuit in said second mode of operation; and circuit means connected to said charging circuit adapted to be connected to a measuring device for visual display of the current flow in said charging circuit when a signal developed in said amplifier output circuit exceeds the threshold level of said pulse generating circuit.

7. An electrical monitoring system comprising:

a photo-electric multiplier tube having a photo cathode, a plurality of dynodes and a collector, said photo-electric amplifier tube being adapted to be connected in an electrical circuit for generating an electrical current, the amplitude of which is a function of light energy impinging on said photo-cathode;

a source terminal and a reference terminal adapted to be connected to a source of energizing potential;

first circuit means connecting said photo cathode and said plurality of dynodes between said source terminal and said reference terminal to provide a constant energization potential for said photo-electric multiplier tube;

a selector switch having a plurality of stationary contacts and a movable contact for electrical connection with successive ones of said plurality of stationary contacts;

a plurality of resistors having at least a pair of terminals;

second circuit means for connecting one terminal of said pair of terminals to various ones of said plurality of stationary contacts so that said movable contact is adapted to make electrical connections to selected ones of said plurality of resistors;

third circuit means connecting said movable contact and said other terminals of said pair of resistor terminals between said collector and said reference point in series with said photo-electric multiplier tube whereby a signal is developed across selected ones of said plurality of resistors connected in series with said photomultiplier as selected by said selector switch the amplitude of said signal being a function of the current generated by said photo electric muliplier tube and the resistance value of the resistors selected by said selector switch;

an amplifier circuit connected to said third circuit means for amplifying said signal developed across selected ones of said plurality of resistors, said amplifier circuit having a predetermined gain;

a trigger circuit having a predetermined threshold level coupled to said amplifier circuit for developing a pulse in response to an amplified voltage pulse greater than said threshold level;

a differentiator circuit connected to said trigger circuit for differentiating a pulse developed by said trigger circuit;

a multivibrator circuit having first and second modes of operation and first and second input circuits for switching said multivibrator circuit into said first and second modes of operation respectively and an output circuit for developing an output voltage when said multivibrator is in said first mode of operation;

circuit means including a diode connected between said differentiator circuit and said second input circuit for passing one polarity of said differentiated pulse for switching said multivibrator circuit into said second mode of operation;

a switching circuit, including a series resistor, connected to said multivibrator output circuit so that said switching circuit presents a short circuit when said multivibrator circuit is in said first mode of operation and presents an open circuit circuit when in said second mode of operation;

a series charging circuit including a first diode, a current meter and a capacitor connected to said switching circuit so that when said switching circuit presents an open circuit, said capacitor charges through said switching circuit resistor, said first diode and current meter at a charging rate determined by the value of said resistor and capacitor to develop a voltage across said capacitor;

a discharge circuit including a second diode connected in series with said capacitor, said discharge circuit being connected to said switching circuit so that said capacitor discharges through said second diode when said switching circuit presents a short circuit;

a Zener diode connected between said capacitor and said first input circuit for switching said multivibrator circuit in said first mode of operation when voltage developed across said capacitor reaches a level to cause a Zener breakdown of said Zener diode thereby providing a charging time for said capacitor of a preset fixed duration, whereby the current flow through said meter represents an average repetition rate of changes in light energy impinging on said photo cathode per given period of time of a predetermined minimum energy variation level as determined by the value of resistance connected in series with the photo-electric multiplier tube selected by the selector switch and the threshold level of said trigger circuit.

8. A photo-electric circuit comprising:

a light sensitive device adapted to be connected in electrical circuits to generate an electrical current in response to the application of light signals, the amplitude of said electrical currents being a function of the amplitude of said applied light signals;

switching means;

a plurality of resistors;

first circuit means connecting said light sensitive device, said switching means and said plurality of resistors in a series circuit so that said switching means is adapted to variably connected selected ones of said plurality of resistors into said series circuit, whereby a voltage pulse is developed across the selected resistors in response to the application of light signals on said light sensitive device, the amplitude of said voltage pulse being directly proportional to the resistance value of said selected resistors and the current generated by said light sensitive device and having a repetition rate determined by the fluctuation rate of said light signals;

a pulse generating circuit having a threshold level for generating an output voltage pulse in response to an input voltage pulse exceeding said threshold level;

second circuit means connecting said first circuit means to said pulse generating circuit for applying input voltage pulses thereto whereby said pulse generating circuit operates as a pulse amplitude detector passing the input voltage pulse greater than said threshold level;

a switching circuit having a stable mode of operation and an unstable mode of operation with an input circuit for switching said switching circuit from said stable mode of operation to said unstable mode of operation, said switching circuit including a charging circuit for developing a voltage across a capacitor, circuit means for switching said switching circuit into said stable mode of operation when the voltage across said capacitor reached a predetermined level and circuit means for discharging said capacitor when said switching circuit is in said stable mode of operation thereby providing a pulse of current of fixed duration for charging said capacitor upon the application of an input pulse to said input circuit, and circuit means connecting a current meter to said charging circuit so that a pulse of current of fixed duration flows through said current meter each time said switching circuit is switched into said unstable mode of operation thereby providing a time average of the pulse repetition rate of voltage pulse applied to said pulse generating circuit exceeding said threshold level.

9. A photo-electric measuring apparatus comprising:

a light sensitive device adapted to be connected in an electrical circuit to generate an electrical current in response to the application of light energy, the amplitude of said electrical current being directly related to the amplitude of said applied light energy;

switching means;

a plurality of resistors;

circuit means connecting said light sensitive device, said switching means and said pulrality of resistors in a signal generating circuit so that said switching means is adapted to variably connect selected ones of said plurality of resistors into said signal generating circuit, whereby a voltage pulse is developed across the selected resistors in response to an impulse of light energy impinging on said light sensitive device, the amplitude of said voltage pulse being directly proportional to the resistance value of said selected resistors and the current generated by said light sensitive device;

a signal conveying circuit coupled to said signal generrating circuit and having a threshold bias to pass only pulses having pulse amplitudes great enough to overcome said bias;

a bi-stable multivibrator circuit having an output circuit and a first and second input circuit, the first input circuit being coupled to said signal conveying circuit wherein said multivibrator circuit is set into a first stable condition with an input pulse from said signal conveying circuit applied thereto;

an integrating circuit, including a capacitor, coupled to said multivibrator output circuit for providing a first direct current path for applying a charging current to said capacitor when said multivibrator is in said first stable state;

circuit means connected to said integrating circuit providing a second direct current path for discharging said capacitor when said mulivibrator is set in a second stable condition;

circuit means coupling said integrating circuit to said second input circuit to set said multivibrator circuit into a second stable condition after said capacitor has been charged to a predetermined voltage thereby providing a pulse of current of fixed duration for charging said capacitor upon the application of an input pulse to said first input circuit, and current responsive means coupled to said first direct current path for providing a visual indication the frequency of said voltage pulses developed by said signal generating circuit above a minimum amplitude determined by the amplitude of applied impulse of light energy, the value of resistance selected by said switching means and the value of said threshold bias.

References Cited

UNITED STATES PATENTS

| | | | |
|---|---|---|---|
| 3,105,146 | 9/1963 | Goupil et al. | 250—43.5 |
| 3,136,892 | 6/1964 | Willett et al. | 250—83.3 |
| 3,139,527 | 6/1964 | Eberline | 250—71.5 |
| 3,320,419 | 5/1967 | Thomas et al. | 250—71.5 |

JAMES W. LAWRENCE, *Primary Examiner.*

C. R. CAMPBELL, *Assistant Examiner.*